US012719202B2

(12) United States Patent
Shibata et al.

(10) Patent No.: US 12,719,202 B2
(45) Date of Patent: Aug. 25, 2026

(54) CONNECTION STRUCTURE FOR CONNECTING HOUSING WITH ACCOMMODATION GROOVE AND COVER WITH ENGAGEMENT PORTION

(71) Applicant: Yazaki Corporation, Tokyo (JP)

(72) Inventors: Shotarou Shibata, Makinohara (JP); Hayato Iizuka, Makinohara (JP); Hideto Kumakura, Makinohara (JP); Takumi Oki, Makinohara (JP); Takuya Ohashi, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 336 days.

(21) Appl. No.: 18/416,300

(22) Filed: Jan. 18, 2024

(65) Prior Publication Data

US 2024/0258738 A1 Aug. 1, 2024

(30) Foreign Application Priority Data

Jan. 30, 2023 (JP) ................................ 2023-011528

(51) Int. Cl.
*H01R 13/50* (2006.01)
*H01R 13/506* (2006.01)

(52) U.S. Cl.
CPC ....... *H01R 13/506* (2013.01); *H01R 2201/26* (2013.01)

(58) Field of Classification Search
CPC .................................................. H01R 13/506
See application file for complete search history.

(56) References Cited

U.S. PATENT DOCUMENTS 10,205,364 B2 * 2/2019 Borgen .................... H02K 7/12
2020/0153131 A1 * 5/2020 Soubjaki ................ H02K 7/116
2023/0142085 A1 5/2023 Inoue

FOREIGN PATENT DOCUMENTS

JP 2022-161493 A 10/2022

* cited by examiner

*Primary Examiner* — Phuong K Dinh
(74) *Attorney, Agent, or Firm* — Sughrue Mion, PLLC

(57) ABSTRACT

A connection structure is a structure for connecting a housing and a cover. In the cover, an engagement portion which protrudes from a main body portion disposed in an opening of the housing is provided. The engagement portion includes a first protruding portion protruding to an outside in an inside-outside direction and a second protruding portion continuing with the first protruding portion to extend in a front-rear direction. In the housing, an accommodation groove for accommodating the engagement portion is provided. The accommodation groove includes a first groove extending in the inside-outside direction and a second groove continuing with the first groove to extend in the front-rear direction. In a state in which the housing and the cover are connected, the first protruding portion is accommodated in the first groove, and the second protruding portion is accommodated in the second groove.

2 Claims, 5 Drawing Sheets

CONNECTION STRUCTURE FOR CONNECTING HOUSING WITH ACCOMMODATION GROOVE AND COVER WITH ENGAGEMENT PORTION

TECHNICAL FIELD

The present invention relates to a connection structure.

BACKGROUND ART

A connector with a cover including a housing to accommodate a terminal and a cover attached to the housing is known (For example, referring to Patent Document 1). In Patent Document 1, a male connector including a male housing, a plurality of male terminals attached to the housing, a substrate to which a base end portion of the male terminal is attached, and a substrate cover configured to protect the substrate is disclosed. The substrate cover has a box shape, and a pair of engagement portions which are formed in rectangular frame shapes to extend in a connection direction with the housing are provided in a left piece and a right piece thereof respectively. The engagement portion engages with a locking protrusion formed in the housing so as to make the locking protrusion to be fit inside of the engagement portion when the substrate cover is attached to the housing. In this way, the substrate cover is held by the housing.

CITATION LIST

Patent Documents

[Patent Document 1] JP 2022-161493A

SUMMARY OF THE INVENTION

Technical Problem

An accommodation groove is formed along the connection direction in the above-described housing. The accommodation groove is configured by a pair of ribs standing up at positions sandwiching the locking protrusion and extending along the connection direction. Inside the accommodation groove, a tip end portion of the engagement portion in a state of engaging with the locking protrusion is accommodated therein to be protected.

However, regarding the above-described connector, the tip portion of the engagement portion in the state of engaging with the locking protrusion is protected; however, it is concerned that a base end portion of the engagement portion is exposed to the outside such that in a case in which an impact or the like is applied to the base end portion, it is possible for this base end portion to be broken.

A purpose of the present invention is to achieve a connection structure for suppressing the structure relating to the connection of the cover and the housing from being broken.

Solution to Problem

In order to achieve a goal of solving the above-mentioned technical problem, a connection structure configured to connect a housing for accommodating a terminal, and a cover for opening and closing an opening provided in the housing is provided, the connection structure includes a main body portion disposed in the opening and an engagement portion protruding from the main body portion that are provided in the cover, the engagement portion including a first protruding portion protruding from the main body portion to an outside in an inside-outside direction toward an inside and an outside of the opening, and a second protruding portion continuing with the first protruding portion and extending in an open-close direction, the open-close direction being orthogonal to the inside-outside direction and being a direction to open and close the cover; and an accommodation groove that is provided in the housing to accommodate the engagement portion, the accommodation groove including a first groove extending in the inside-outside direction, and a second groove continuing with the first groove to extend in the open-close direction, wherein in a state in which the housing and the cover are connected, the first protruding portion is accommodated in the first groove, and the second protruding portion is accommodated in the second groove.

Effect of the Invention

According to the present invention, it is possible to achieve a connection structure for suppressing the structure relating to the connection of the cover and the housing from being broken.

DESCRIPTION OF EMBODIMENTS

Figure 1A:
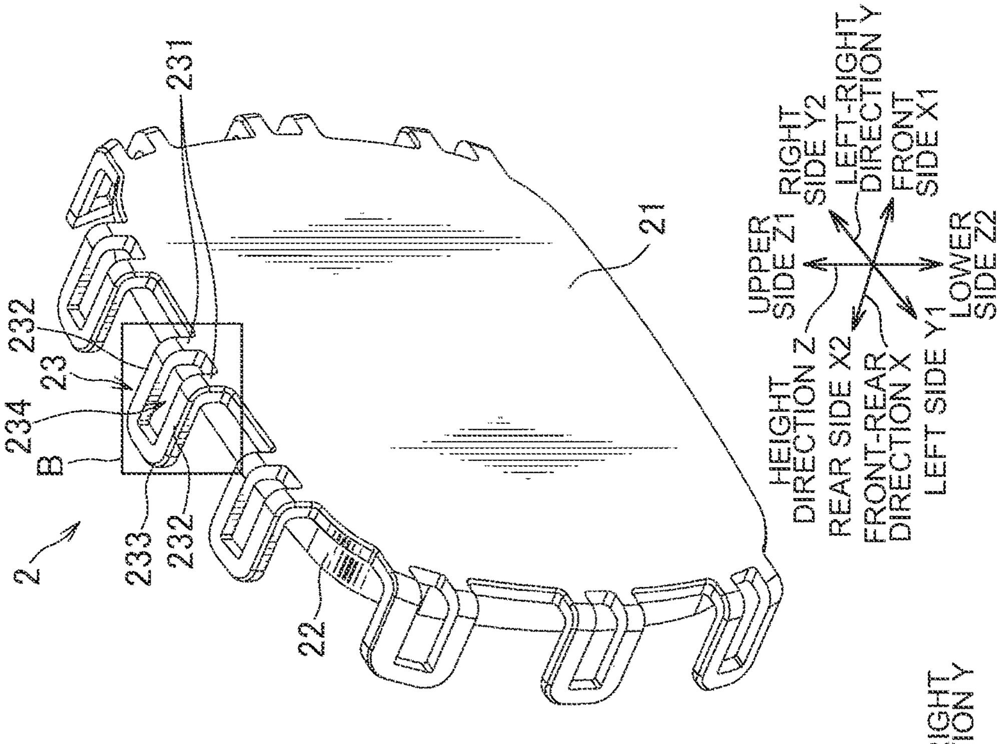
FIG. 1A is a perspective view showing a housing configuring a connection structure according to an embodiment of the present invention.

Hereinafter, a connection structure will be described. A connection structure according to an embodiment of the present invention, for example, is a structure for connecting a housing 1 that configures a part of a wire harness being routed in a vehicle or the like and a cover 2 to open and close an opening of the housing 1.

In the figures, a direction X, a direction Y, and a direction Z are directions being orthogonal to (intersecting to) each other. An open-close direction in which the cover 2 opens and closes the opening of the housing 1 is referred to as a front-rear direction and recorded as a “front-rear direction X”. Also, one side in the front-rear direction X is recorded as a “front side X1”, and the other side is recorded as a “rear side X2". A left-right direction of the housing 1 is recorded as a "left-right direction Y". Also, one side in the left-right direction Y is recorded as a "left side Y1", and the other side is recorded as a "right side Y2". A height direction of the housing 1 is recorded as a "height direction Z". Also, one side in the height direction Z is recorded as a "upper side Z1", and the other side is recorded as a "lower side Z2". This is only for the convenience of description, and it does not necessarily match the direction in the actual usage state, and it is not used to limit the direction in the actual usage state.

The housing 1 is a cylindrical housing member that accommodates an electric wire with a terminal (not shown) and a mating terminal connected to the terminal of the electric wire with a terminal, and the housing 1 includes a first housing 11, a second housing 12, and a third housing 13 formed of a material such as resin.

The first housing 11 is a housing into which the above-described electric wire with a terminal is inserted. As shown in FIG. 1A, this first housing 11 is formed in a cylindrical shape extending in the height direction Z, and a plurality of the first housings 11 are arranged side by side in the left-right direction Y According to the present embodiment, four first housings 11 are formed, however, a number of the first housings 11 is not limited to this configuration, and may be equal to or less than four, or equal to or more than four.

The second housing 12 is a housing that accommodates the terminal of the above-described electric wire with a terminal. This second housing 12 is formed in a cylindrical shape with a bottom extending in the front-rear direction X and opens at the front side X1, by a bottom wall 121 having a substantially oval shape that is longer in the left-right direction Y, and a side wall 122 standing up from a peripheral edge portion of the bottom wall 121 toward the front side X1.

Three partition plates 1211 that stand up at the front side X1 and extend in the height direction Z are formed on the bottom wall 121 at intervals in the left-right direction Y A space within the second housing 12 is partitioned by this partition plate 1211 into four terminal accommodation chambers S arranged side by side in the left-right direction Y A first hole portion 1211*a* that opens in the front-rear direction X is formed in the bottom wall 121 of each terminal accommodation chamber S. An end portion at the upper side Z1 of the terminal of the electric wire with a terminal is inserted into the first hole 1211*a*.

The side wall 122 is formed into a plate shape surrounding the edge portion of the bottom wall 121. An end portion at the upper side Z1 of the first housing 11 is connected to a portion at the lower side Z2 of the side wall 122. A second hole portion 122*a* penetrating in the height direction Z is formed in a portion at the lower side of this side wall 122, wherein the first housing 11 and the second housing 12 are communicated with each other via the second hole portion 122*a*.

An end portion at the front side X1 of the side wall 122 configures an opening edge portion 122*b* of the second housing 12. The opening edge portion 122*b* is formed into a convex curved surface at the front side X1 so as to make an engagement portion 23 having an L-shaped cross section provided on in cover 2 described later to be easy to fit therein.

A packing P is attached to an inner surface of the side wall 122 along the opening edge portion, and a gap between the second housing 12 and the cover 2 is sealed by the packing P. The packing P does not necessarily have to be attached to the inner surface of the side wall 122, and may be arranged at the cover 2 side.

Figure 2A:
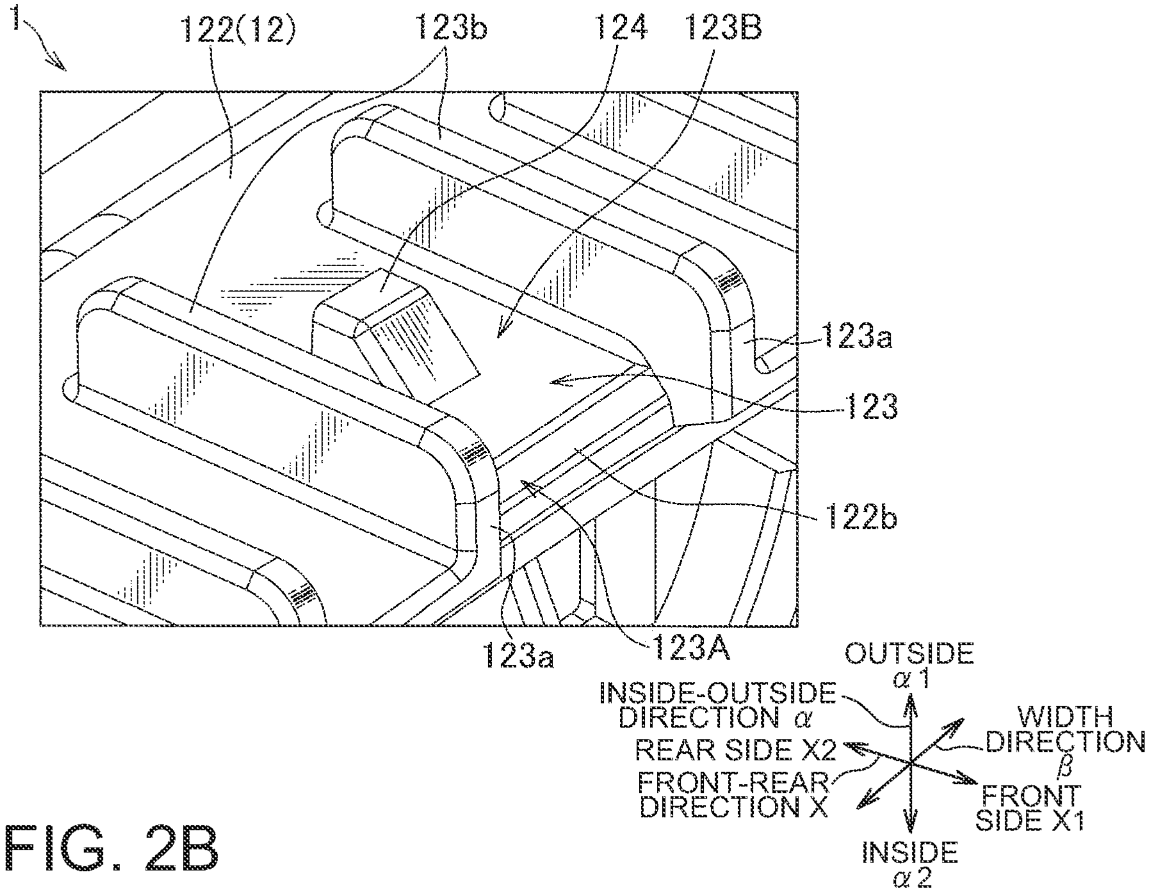
FIG. 2A is an enlarged view showing an area A in FIG. 1A.

An accommodation groove 123 extending in the front-rear direction X is formed at the outer surface of the side wall 122. The accommodation groove 123 is a portion that accommodates the engagement portion 23 of the cover 2, which will be described later. As shown in FIG. 2A, the accommodation groove 123 includes a first groove 123A and a second groove 123B. Also, as shown in in FIG. 2A, FIG. 2B, FIG. 4A to FIG. 4C, and FIG. 5A to FIG. 5C, a direction toward the inside and outside of the opening edge portion (opening) 122*b* while being orthogonal to the front-rear direction (open-close direction) X is recorded as an "inside-outside direction α", wherein one side in the inside-outside direction is recorded as an "outside α1", and the other side in the inside-outside direction is recorded as an "inside α2". Also, a width direction of the accommodation groove 123 that is a direction intersecting to the front-rear direction X is recorded as a "width direction β".

As shown in FIG. 2A, the first groove 123A is a groove extending in the inside-outside direction α. The first groove 123A is configured by a pair of first ribs 123*a* which face each other with an interval therebetween in the width direction β, protrude from the opening edge portion 122*b* toward the front side X1, and extend in the inside-outside direction α.

As shown in FIG. 2A, the second groove 123B is a groove extending in the front-rear direction X. The second groove 123B is configured by a pair of second ribs 123*b* which face each other with an interval therebetween in the width direction β and extend from the opening edge portion 122*b* toward the rear side X2.

Figure 3:
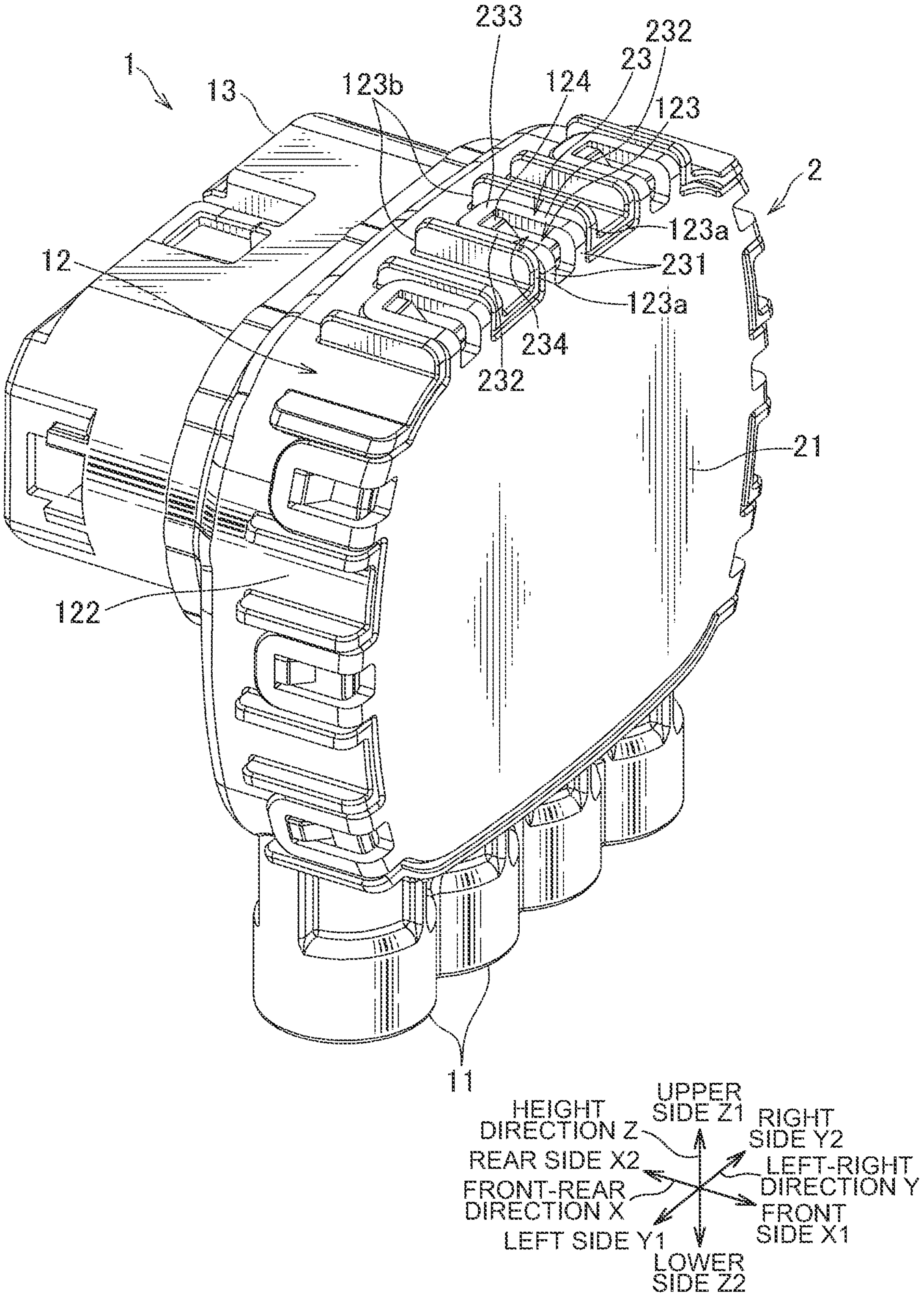
FIG. 3 is a perspective view showing the housing and the cover in a connected state.

A locking protrusion 124 standing up in the outside α1 of the second housing 12 is formed in the accommodation groove 123. The locking protrusion 124 is a portion that locks the engagement portion 23 of the cover 2, and is adapted to fit into an engagement hole 234 of the engagement portion 23, as shown in FIG. 3.

The third housing 13 is a housing for accommodating the mating terminal to which the terminal of the electric wire with a terminal is connected. The third housing 13 is formed in a bottomed cylindrical shape that opens at the rear side X2, and is connected to a portion at the upper side Z1 of the surface at the rear side X2 in the bottom wall 121 of the second housing 12. Although it is not shown in figures, four of the mating terminal accommodation chambers being partitioned in the left-right direction Y are formed inside the third housing 13, this mating terminal accommodation chamber communicates with the corresponding terminal accommodation chamber S via the first hole portion 1211*a* formed in the above-described terminal accommodation chamber S.

Figure 1B:
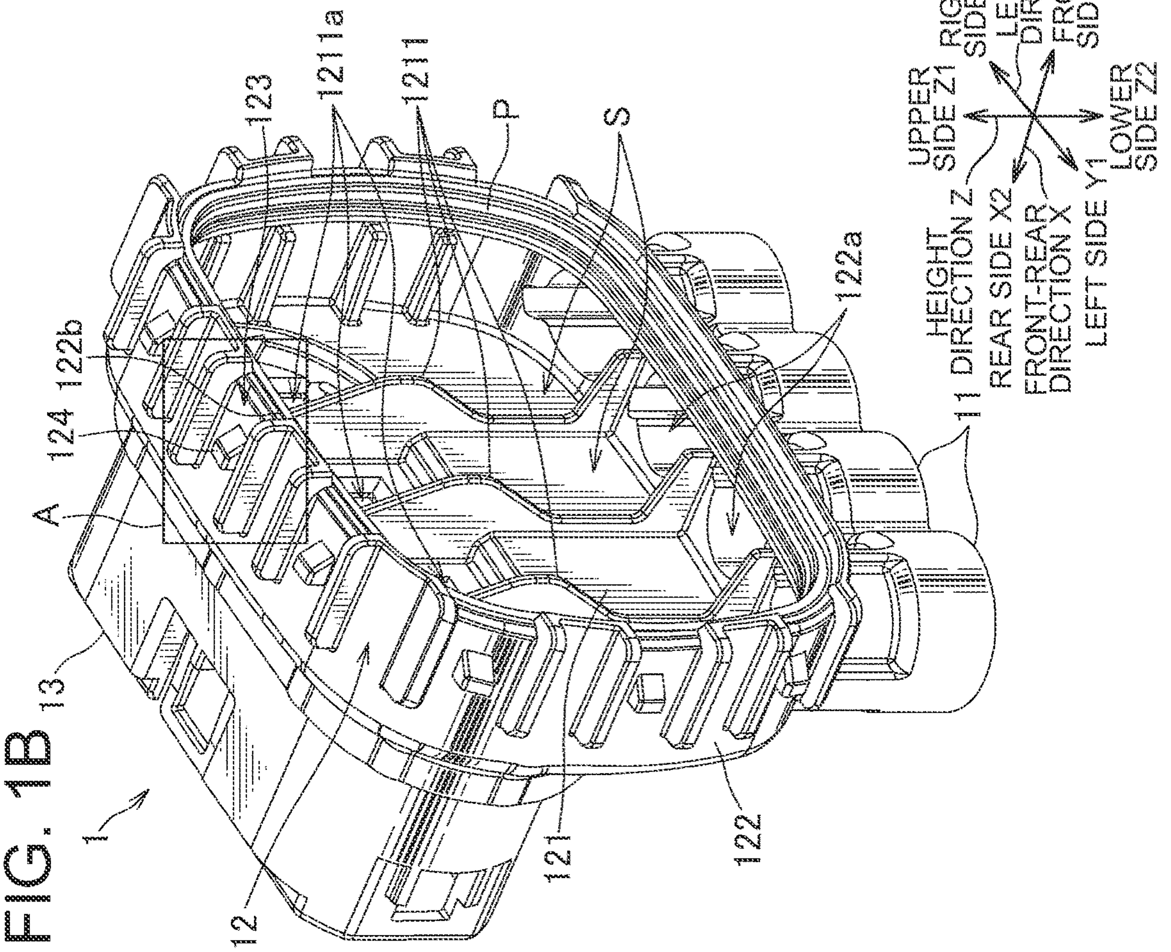
FIG. 1B is a perspective view showing a cover configuring the connection structure according to an embodiment of the present invention.

The cover 2 is a cover member for opening and closing the opening of the second housing 12 (housing 1). The cover 2 may be formed of various materials such as a resin material, a conductive material, and the like corresponding to the usage of the housing 1, and in a case in which the electric wire accommodated in the housing 1 is a shielded wire, the cover 2 may have a shielding function. As shown in FIG. 1B, the cover 2 includes a main body portion 21, a sealing portion 22, and an engagement portion 23.

The body portion 21 is formed a substantially oval-plate shape to fit into the opening of the second housing 12 to occlude this opening. That is, the main body portion 21 is disposed inside the opening of the second housing 12.

The sealing portion 22 is formed to stand up in the rear side X2 from the surface at the rear side X2 of the main body portion 21 and surround the main body portion 21 along the edge portion of the main body portion 21. When the cover 2 is attached to the housing 1, the outer surface of the sealing portion 22 comes into contact with the inside surface of the above-described packing P that is attached to the side wall 122, and thus the gap between the housing 1 and the cover 2 is sealed.

Figure 2B:
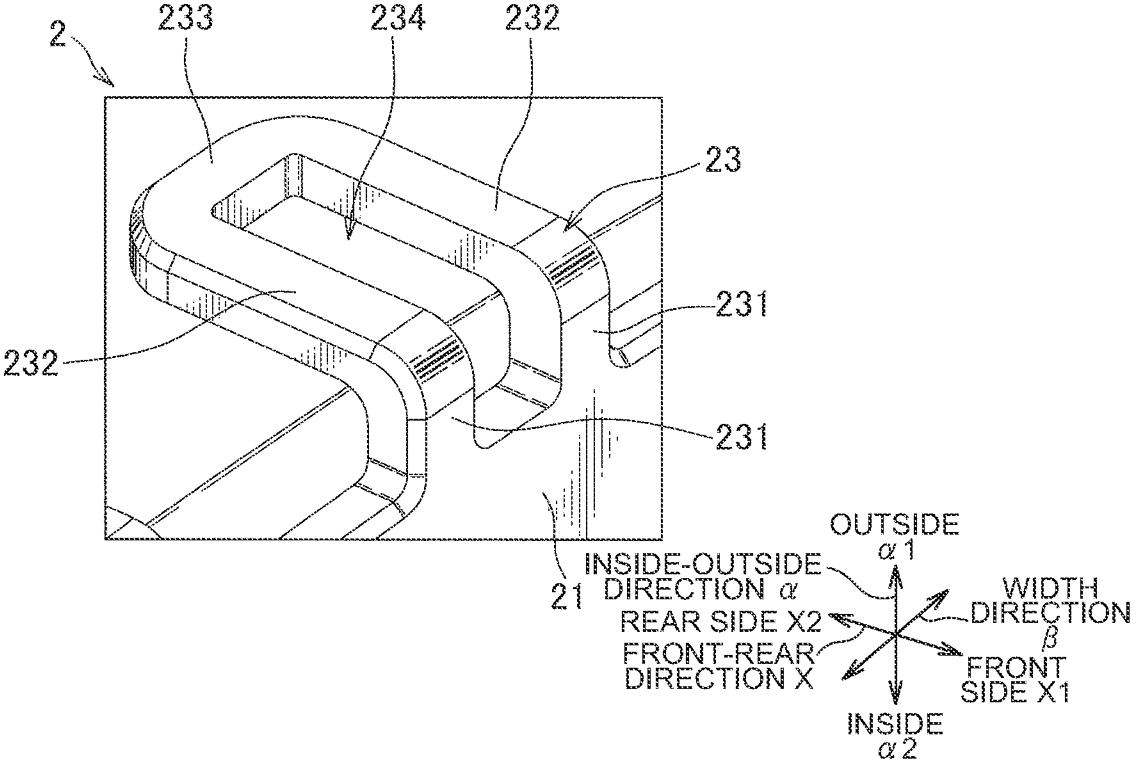
FIG. 2B is an enlarged view showing an area B in FIG. 1B.

The engagement portion 23 is configured of an elastic member having a predetermined width in the width direction β, and is formed in a shape having an L-shaped cross section and protruding from the main body portion 21. The engagement portion 23, as shown in FIG. 2B, includes a pair of first protruding portions 231, a pair of second protruding portions 232, and a connection portion 233.

The pair of first protruding portions 231 face each other at an interval in the width direction β, and each protrudes in the outside α1 (outward side) from the end edge of the main body portion 21. The pair of second protruding portions 232 are continuous to the first pair of protruding portions 231, and extend in the rear side X2 from the protruding end portions of the first protruding portions 231, respectively. The dimension from one to the other of the pair of first protruding portions 231 in the width direction β (the dimension from one to the other of the pair of second protruding portions 232 in the width direction 3) is set substantially the same as a groove width of the accommodation groove 123. Therefore, when connecting the cover 2 to the housing 1, both end portions of the engagement portion 23 in the width direction β are in contact with the inner wall surface of the accommodation groove 123 such that the engagement portion 23 is guided in the front-rear direction X.

The connection portion 233 extends in the width direction β and is connecting the end portions of the pair of second protruding portions 232 at the rear side X2. Due to such a structure, an engagement hole 234 being surrounded by the first protruding portions 231, the second protruding portions 232, and the connection portion 233 and penetrating in the height direction Z and the front-rear direction X is formed in the central of the engagement portion 23. The above-described locking protrusion 124 fits into the engagement hole 234 and thus, as shown in FIG. 3, the cover 2 is fixed with respect to the housing 1.

Figure 4A:
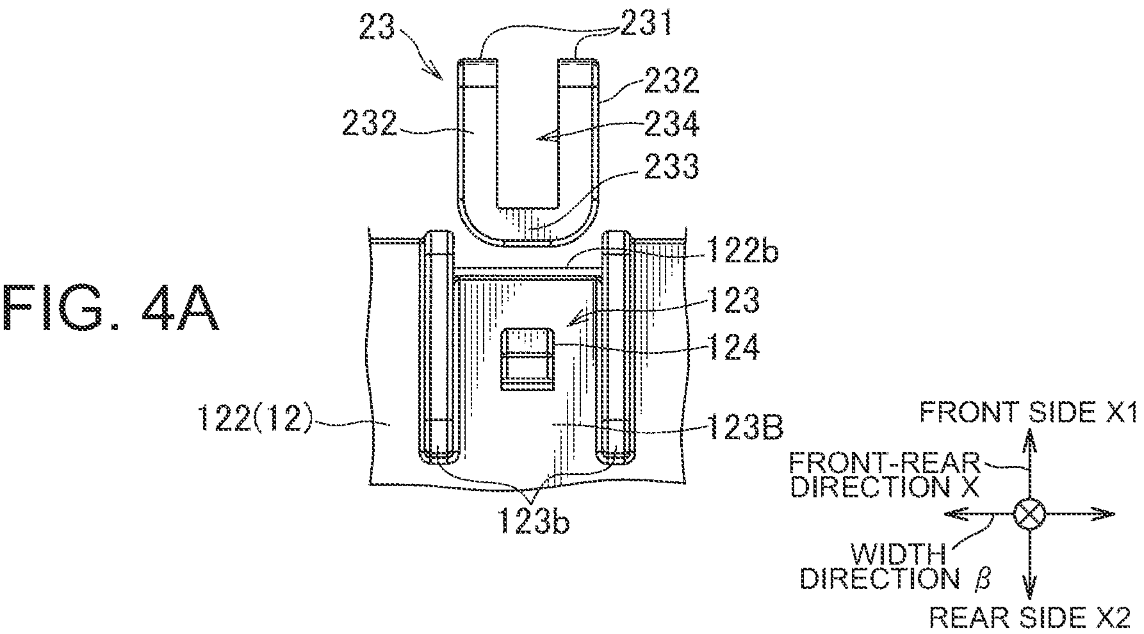
FIG. 4A is a planar view showing the housing and the cover in a state before the connection.
Figure 4B:
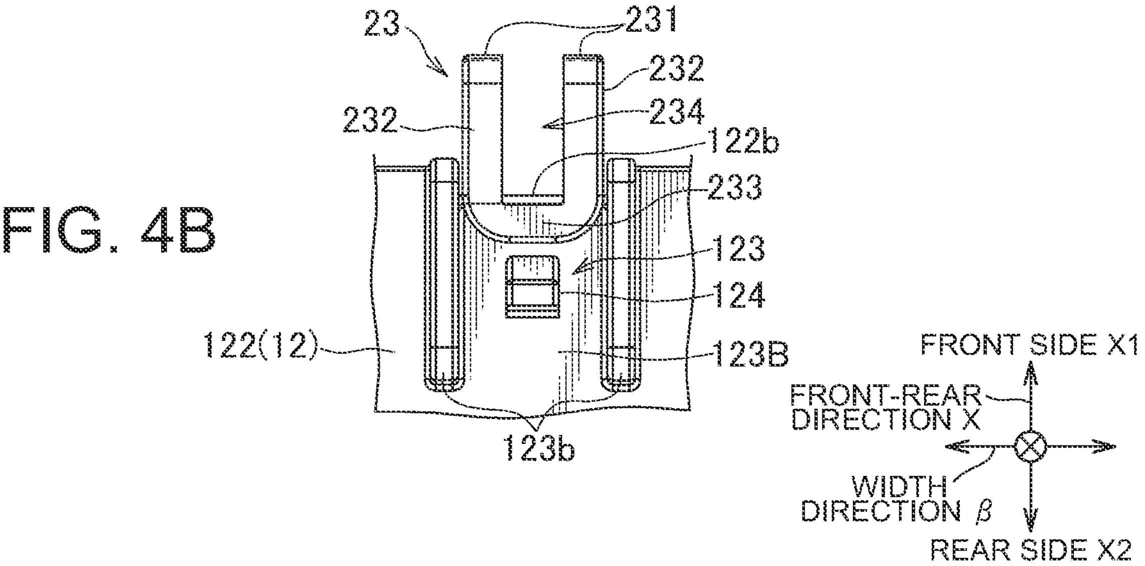
FIG. 4B is a planar view showing the housing and the cover during the connection.
Figure 4C:
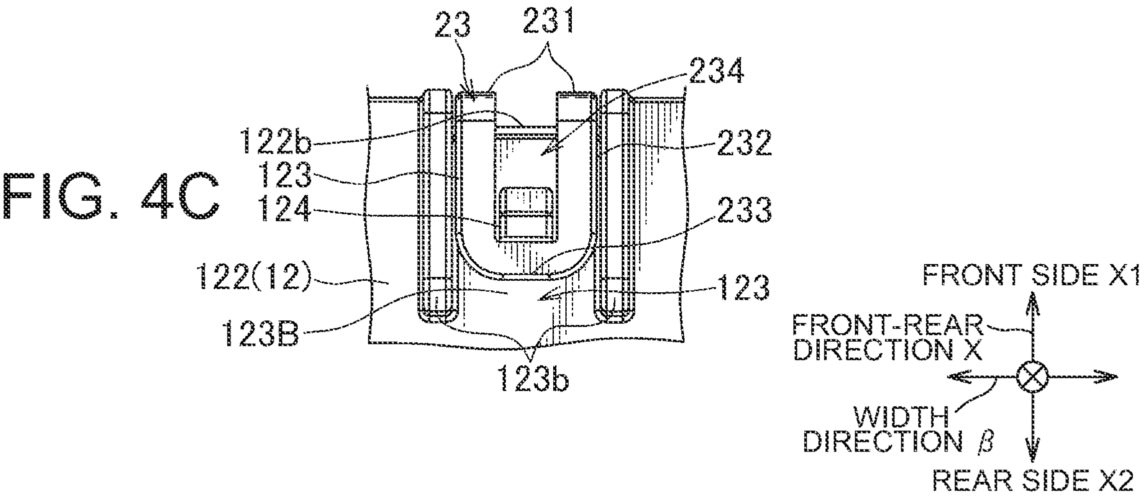
FIG. 4C is a planar view showing the housing and the cover in a state when the connection is finished.
Figure 5A:
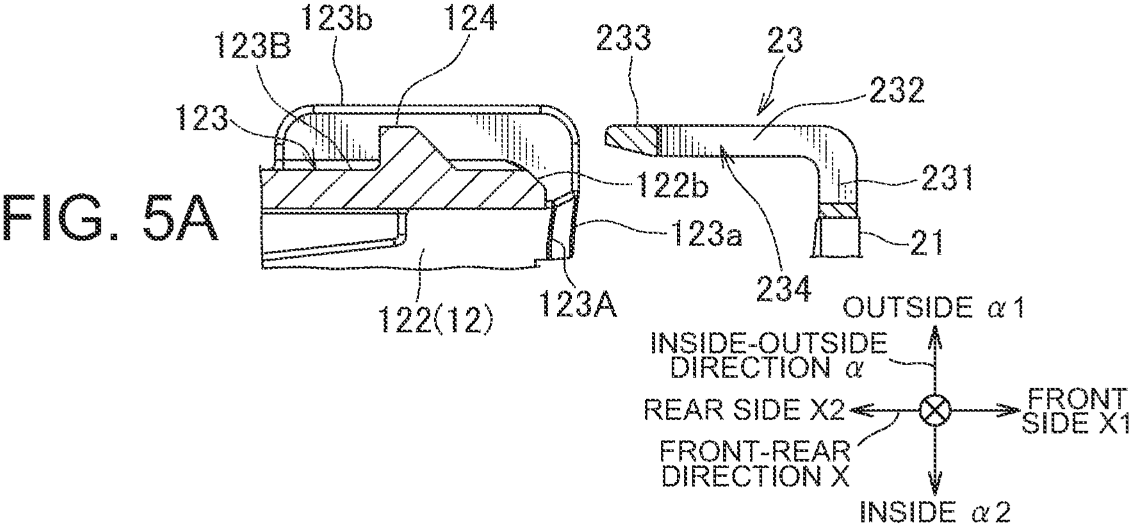
FIG. 5A is a cross-sectional view showing the housing and the cover in a state before the connection.
Figure 5B:
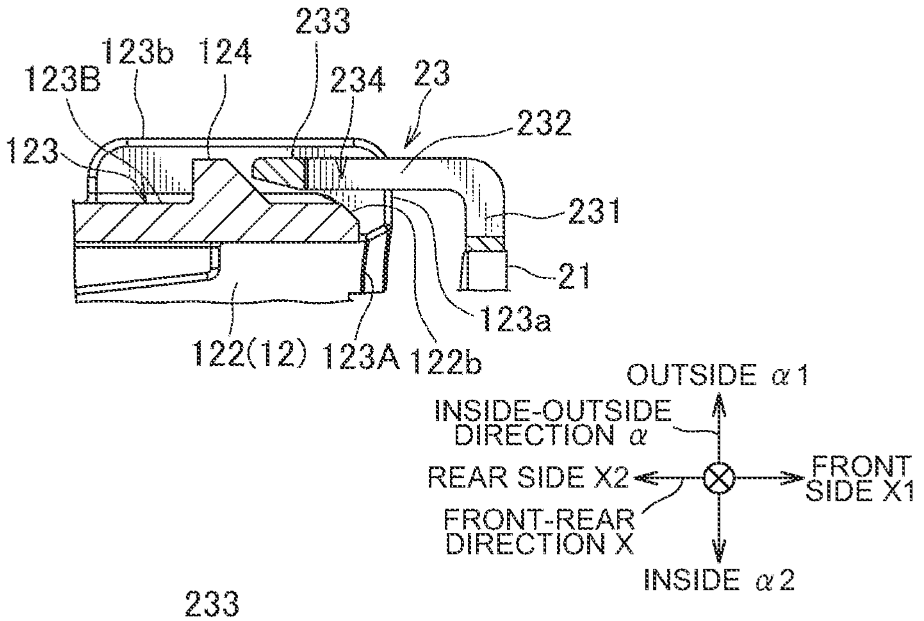
FIG. 5B is a cross-sectional view showing the housing and the cover during the connection.

Next, the connection between the housing 1 and the cover 2 will be described. FIG. 4A is a planar view showing the housing 1 and the cover 2 in a state before the connection, FIG. 4B is a planar view showing the housing 1 and the cover 2 during the connection, and FIG. 4C is a planar view showing the housing 1 and the cover 2 in a state when the connection is finished. FIG. 5A is a cross-sectional view showing the housing 1 and the cover 1 in the state before the connection, FIG. 5B is a cross-sectional view showing the housing 1 and the cover 2 during the connection, and FIG. 5C is a cross-sectional view showing the housing 1 and the cover 2 in a state when the connection is finished.

Firstly, as shown in FIG. 4A, the cover 2 is disposed at a position where the connection portion 233 of the engagement portion 23 and opening edge portion 122*b* of the accommodation groove 123 face each other in the front-rear direction X. At this time, as shown in FIG. 5A, the position of the cover 1 is adjusted such that the end portion at the outside α1 of the connection portion 233 is positioned at the inside α2 with respect to the end portion at the outside α1 of the accommodation groove 123.

Then, in this state, as shown in FIG. 4B, the cover 2 is moved to the rear side X2. At this time, the wall surface at the outside in the width direction β of the second protruding portion 232 of the engagement portion 23 is in contact with the inner wall surfaces of the first rib 123*a* and the second rib 123*b* and slides thereon such that the engagement portion 23 is guided in the front-rear direction X. Therefore, the cover 2 is connected to the housing 1 without misalignment of the position of the cover 2 with respect to the housing 1.

Figure 5C:
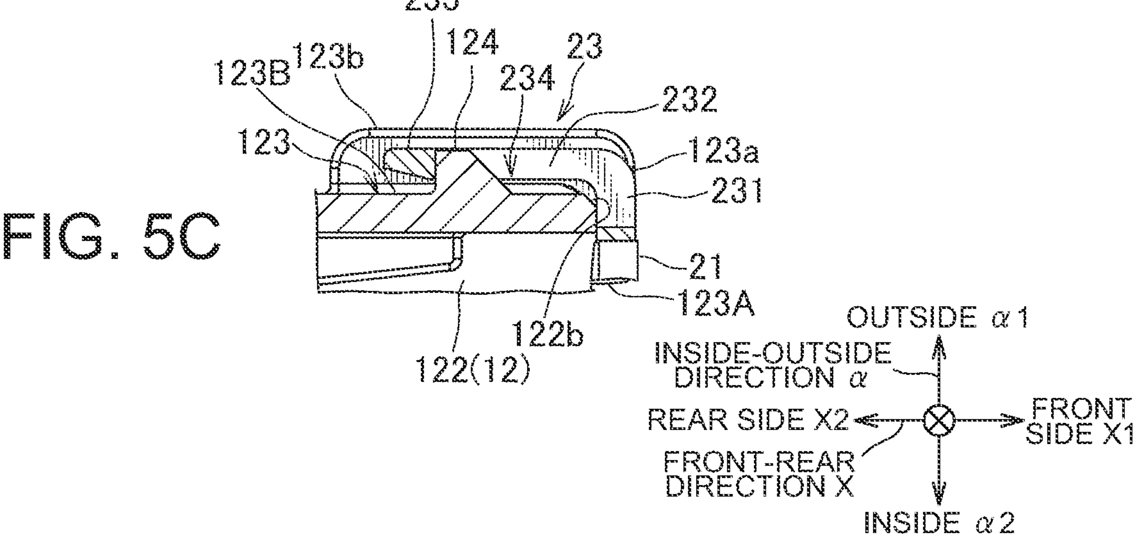
FIG. 5C is a cross-sectional view showing the housing and the cover in a state when the connection is finished.

Furthermore, when the cover 2 is moved in the rear side X2, as shown in FIG. 4C and FIG. 5C, the connection portion 233 rides over the locking protrusion 124 while being elastically deformed in the outside α1. Thus, the locking protrusion 124 is fitted into the engagement hole 234 of engagement portion 23. In this state, the end portion at the front side X1 of the connection portion 233 abuts against the end portion at the rear side X2 of the locking protrusion 124, and due to this configuration, the engagement portion 23 is locked. Also, in this state, the engagement portion 23 with the L-shaped cross section is hooked to the opening edge portion 122*b* as a hook such that a displacement of the cover 2 with respect to the housing 1 is regulated.

As shown in FIG. 4C and FIG. 5C, in the state in which the connection of the housing 1 and the cover 2 is completed, the first protruding portion 231 is accommodated in the first groove 123A, and the second protruding portion 232 is accommodated in the second groove 123B.

As described above, according to the above-described embodiment, the connection structure is a connection structure for connecting the housing 1 configured to accommodate the terminal and the cover 2 configured to open and close the opening provided in the housing 1. In the cover 2, the main body portion 21 which is disposed in the opening and an engagement portion 23 which protrudes from the main body portion 21 are provided. The engagement portion 23 includes a first protruding portion 231 protruding from the main body portion 21 to the outside α1 in the inside-outside direction α and a second protruding portion 232 continuing with the first protruding portion 231 to extend in the front-rear direction (open-close direction) X. In the housing 1, the accommodation groove 123 for accommodating the engagement portion 23 is provided. The accommodation groove 123 includes a first groove 123A extending in the inside-outside direction α and a second groove 123B continuing with the first groove 123A to extend in the front-rear direction X. In the state in which the housing 1 and the cover 2 are connected, the first protruding portion 231 is accommodated in the first groove 123A, and the second protruding portion 232 is accommodated in the second groove 123B.

According to such a configuration, in the state in which the housing 1 and the cover 2 are connected, the main body portion 21 of the cover 2 is disposed within the opening of the housing 1, the first protruding portion 231 of the engagement portion 23 of the cover 2 is accommodated in the first groove 123A of the accommodation groove 123, and the second protruding portion 232 is accommodated in the second groove 123B of the accommodation groove 123. Therefore, without any portion of engagement portion 23 being exposed to the outside, it is possible to prevent the engagement portion 23 from being broken when an impact or the like is applied to engagement portion 23. Thus, it is possible to achieve a connection structure configured to prevent the structure relating to the connection between the cover 2 and housing 1 from being broken.

Also, according to the present embodiment, the engagement portion 23 has the predetermined width in the width direction β, by both end portions in the width direction β of the engagement portion 23 come into contact with the inner wall surface of the accommodation groove 123, the engagement portion 23 is guided in the front-rear direction X. According to such a configuration, the engagement portion 23 is guided by the inner wall surface of the accommodation groove 123 such that the cover 2 can be smoothly connected to the housing 1. Also, in this manner, the accommodation groove 123 functions as a guide for determining the position when connecting the cover 2 to the housing 1, and thus it is unnecessary to provide a guide for positioning again in other part of the housing 1 and the cover 2 such that it is possible to miniaturize the structure of the housing 1 and the cover 2 to this extent.

Also, according to the present embodiment, it is possible to configure the first groove 123A by the pair of first ribs 123*a* formed in the housing 1 and configure the second groove 123B by the pair of second ribs 123*b* formed in the housing 1.

Also, according to the present embodiment, the engagement portion 23 is formed of the first protruding portion 231 and the second protruding portion 232 with the L-shaped cross section. Accordingly, by hooking the engagement portion 23 to the opening edge portion 122*b* as a hook, it is possible to regulate the cover 2 from displacing with respect to the housing 1 so as to stably keep the state in which the cover 2 is connected to the housing 1.

Although an embodiment of the connection structure has been described in detail by reference to the drawings, the specific configuration is not limited to these embodiments, any design changes without departing from the scope of the present invention should also be included in the present invention.

For example, according to the present embodiment, the first groove 123A of the accommodation groove 123 is formed by using the first rib 123*a*, however, the structure of the first groove 123A is not limited thereto. For example, the first groove 123A may be configured by forming a concave portion being concave to the rear side X2 in the portion where the accommodation groove 123 is formed in the opening edge portion 122*b* of the second housing 12. Also, the second groove 123B of the accommodation groove 123 is formed by using the second rib 123*b*, however, the structure of the second groove 123B is not limited thereto. For example, the second groove 123B may be configured by a concave portion that is formed to be concave to the lower side in the outer surface of the side wall 122. According to such a configuration, for example, the breakage of the accommodation groove 123 or the like due to the chipping of the first rib 123*a* and the second rib 123*b* does not occur such that it is possible to stably maintain the connection structure.

REFERENCE SIGNS LIST

α inside-outside direction
X front-rear direction (open-close direction)
1 housing
123 accommodation groove
123A first groove
123B second groove
2 cover
21 main body portion
23 engagement portion

What is claimed is:

1. A connection structure configured to connect a housing for accommodating a terminal and a cover for opening and closing an opening provided in the housing, comprising:

a main body portion disposed in the opening and an engagement portion protruding from the main body portion that are provided in the cover, wherein the engagement portion includes:

a first protruding portion protruding from the main body portion to an outside in an inside-outside direction toward an inside and an outside of the opening, and a second protruding portion continuing with the first protruding portion and extending in an open-close direction, the open-close direction being orthogonal to the inside-outside direction and being a direction to open and close the cover; and an accommodation groove that is provided in the housing to accommodate the engagement portion, the accommodation groove including a first groove extending in the inside-outside direction, and a second groove continuing with the first groove to extend in the open-close direction, wherein in a state in which the housing and the cover are connected, the first protruding portion is accommodated in the first groove, and the second protruding portion is accommodated in the second groove, wherein the engagement portion has a predetermined width in a width direction intersecting the open-close direction, wherein the engagement portion is guided in the open-close direction by abutting both end portions of the engagement portion in the width direction to an inner wall surface of the accommodation groove, wherein the housing includes a pair of first ribs and a pair of second ribs, wherein the pair of first ribs face each other with an interval therebetween in the width direction, protrude from an opening edge portion of the opening in the open-close direction, and extend in the inside-outside direction, wherein the pair of second ribs face each other with an interval therebetween in the width direction and extend from the opening edge portion in the open-close direction, wherein the pair of first ribs configure the first groove, and wherein the pair of second ribs configure the second groove.

2. The connection structure according to claim 1, wherein the engagement portion is formed with an L-shaped cross section by the first protruding portion protruding from an end edge of the main body portion in the inside-outside direction and the second protruding portion extending from a protruding end portion of the first protruding portion in the open-close direction.

* * * * *